US012142878B2

(12) United States Patent
Otsuta et al.

(10) Patent No.: US 12,142,878 B2
(45) Date of Patent: Nov. 12, 2024

(54) SHIELDED CONNECTOR

(71) Applicant: Yazaki Corporation, Tokyo (JP)

(72) Inventors: Yasuhiro Otsuta, Makinohara (JP); Masato Taira, Makinohara (JP); Miyuki Fukunaga, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 400 days.

(21) Appl. No.: 17/850,143

(22) Filed: Jun. 27, 2022

(65) Prior Publication Data

US 2022/0416478 A1 Dec. 29, 2022

(30) Foreign Application Priority Data

Jun. 28, 2021 (JP) ................................ 2021-106998

(51) Int. Cl.
*H01R 13/648* (2006.01)
*H01R 13/502* (2006.01)
*H01R 13/52* (2006.01)
*H01R 13/6582* (2011.01)

(52) U.S. Cl.
CPC ....... *H01R 13/6582* (2013.01); *H01R 13/502* (2013.01); *H01R 13/5216* (2013.01)

(58) Field of Classification Search
CPC .............. H01R 13/6582; H01R 13/502; H01R 13/5216
USPC .................................................... 439/607.01
See application file for complete search history.

(56) References Cited

U.S. PATENT DOCUMENTS

| | | | | |
|---|---|---|---|---|
| 4,684,192 A * | 8/1987 | Long | H01R 13/629 | 439/350 |
| 8,905,781 B2 * | 12/2014 | Chen | H01R 13/627 | 439/63 |
| 10,096,936 B2 * | 10/2018 | Ju | H01R 13/405 | |
| 10,559,919 B2 * | 2/2020 | Masuda | H01R 13/62955 | |
| 10,720,736 B2 * | 7/2020 | Yamanashi | H01R 13/6592 | |
| 10,868,388 B2 * | 12/2020 | Li | H01M 50/244 | |
| 2012/0264331 A1 * | 10/2012 | Jimbo | H01R 13/6592 | 439/607.01 |

FOREIGN PATENT DOCUMENTS

JP 2019-110042 A 7/2019

* cited by examiner

*Primary Examiner* — Abdullah A Riyami
*Assistant Examiner* — Vladimir Imas
(74) *Attorney, Agent, or Firm* — Sughrue Mion, PLLC

(57) ABSTRACT

A shielded connector includes a housing having a front opening portion and an electric wire insertion portion, a terminal to be accommodated in a terminal accommodating portion of the housing and to be connected to a mating terminal, a connection terminal to be connected to an electric wire, a first shielding shell to cover a rear surface of the housing, a second shielding shell having a braid connection portion and a shell fixing portion to be connected to the first shielding shell, a first fastening member to fasten the housing to the first shielding shell, a second fastening member to fasten the connection terminal to the terminal, and a third fastening member to fasten the shell fixing portion to the first shielding shell. The first, second and third fastening members have fastening directions parallel to each other, and are fastened from a front surface side of the housing.

5 Claims, 12 Drawing Sheets

SHIELDED CONNECTOR

CROSS-REFERENCE TO RELATED APPLICATION

The present application claims priority to Japanese Patent Application No. 2021-106998 filed on Jun. 28, 2021, the entire content of which is incorporated herein by reference.

TECHNICAL FIELD

The presently disclosed subject matter relates to a shielded connector.

BACKGROUND

A shielded connector of the related art includes a housing that holds a terminal provided at an end portion of a wiring member (electric wire), a cover member that covers a working opening of the housing, a shielding member that covers an outer side of the housing with a first shell and a second shell provided to face each other with the outer side of the housing interposed therebetween along a thickness direction and electromagnetically shields the outer side of the cover member, and an electromagnetic shielding cover member that covers and electromagnetically shields an outer side of the cover member (for example, refer to JP2019-110042A).

The housing includes a tubular portion through which the wiring member is inserted, and a terminal holding portion that holds the terminal such that a direction of intersection with the wiring member is a fitting direction, and is configured in a substantially L-shape. The terminal whose direction of intersection with the wiring member is the fitting direction cannot be inserted through the tubular portion in a state where the terminal is connected to the end portion of the wiring member. Therefore, the working opening for connecting the terminal to the end portion of the wiring member, which is inserted through the tubular portion and is drawn into the terminal holding portion, is formed on a rear surface side of the terminal holding portion.

The shielded connector includes a press-fit structure portion. Therefore, when the shielded connector is assembled, a press-fit projection portion provided in the first shell can be press-fitted into a press-fit recess portion provided in the housing, and a distal portion of the press-fit projection portion can be accommodated in an accommodation recess portion provided in the second shell. That is, the shielded connector positions relative positions of the first shell and the second shell in a state where relative positions of the housing and the first shell are fixed. In a state where the first shell and the second shell accommodate the housing in an accommodation space portion, the shielded connector is assembled by being fastened together with the electromagnetic shielding cover member to a connection counterpart by a fastening member.

In the shielded connector including the press-fit structure portion, when the accommodation recess portion of the second shell is accommodated in the press-fit protrusion portion of the first shell press-fitted into the press-fit recess portion of the housing, the accommodation recess portion needs to be aligned with the distal portion of the press-fit protrusion portion exposed from the press-fit recess portion. However, when the shielded connector is assembled to the connection counterpart, if it is attempted to accommodate the accommodation recess portion of the second shell in the press-fit protrusion portion of the first shell from a fastening direction (rear surface side of the housing) of the fastening member, an accommodation portion is difficult to see, and workability is not good. The shielded connector has a structure in which the first shell and the second shell, which are shielding members, are fastened together to the connection counterpart by the fastening member in a state where the housing is accommodated in the accommodation space portion. Therefore, the shielded connector cannot be assembled by integrally fixing the shielding members, the housing, and the electromagnetic shielding cover member before being assembled to the connection counterpart, and handling handleability)(is not good.

SUMMARY

Illustrative aspects of the presently disclosed subject matter provide a shielded connector which is easy to handle and can improve assembling workability.

According to an illustrative aspect of the presently disclosed subject matter, a shielded connector includes a housing having a front opening portion configured to be covered by an inner housing in which a connector fitting portion configured to be fitted to a mating connector is formed, and an electric wire insertion portion having a tubular shape and opened in a second direction intersecting a first direction in which the front opening opens, a terminal configured to be accommodated in a terminal accommodating portion of the housing and having a distal portion configured to be connected to a mating terminal, a connection terminal having one end configured to be connected to an end of an electric wire, a first shielding shell configured to cover a rear surface of the housing opposite to a front surface of the housing on which the front opening portion is provided, a second shielding shell having a braid connection portion to which a braid covering the electric wire led out from the electric wire insertion portion is to be connected, and a shell fixing portion configured to be electrically connected to the first shielding shell, a first fastening member configured to fasten the housing to the first shielding shell, a second fastening member configured to fasten the other end of the connection terminal to a placement portion of the terminal accommodated in the terminal accommodating portion of the housing, and a third fastening member configured to fasten the shell fixing portion of the second shielding shell to the first shielding shell. The first fastening member, the second fastening member, and the third fastening member have fastening directions parallel to each other, and are fastened from a front surface side of the housing.

Other aspects and advantages of the presently disclosed subject matter will be apparent from the following description, the drawings and the claims.

DESCRIPTION OF EMBODIMENTS

Figure 1:
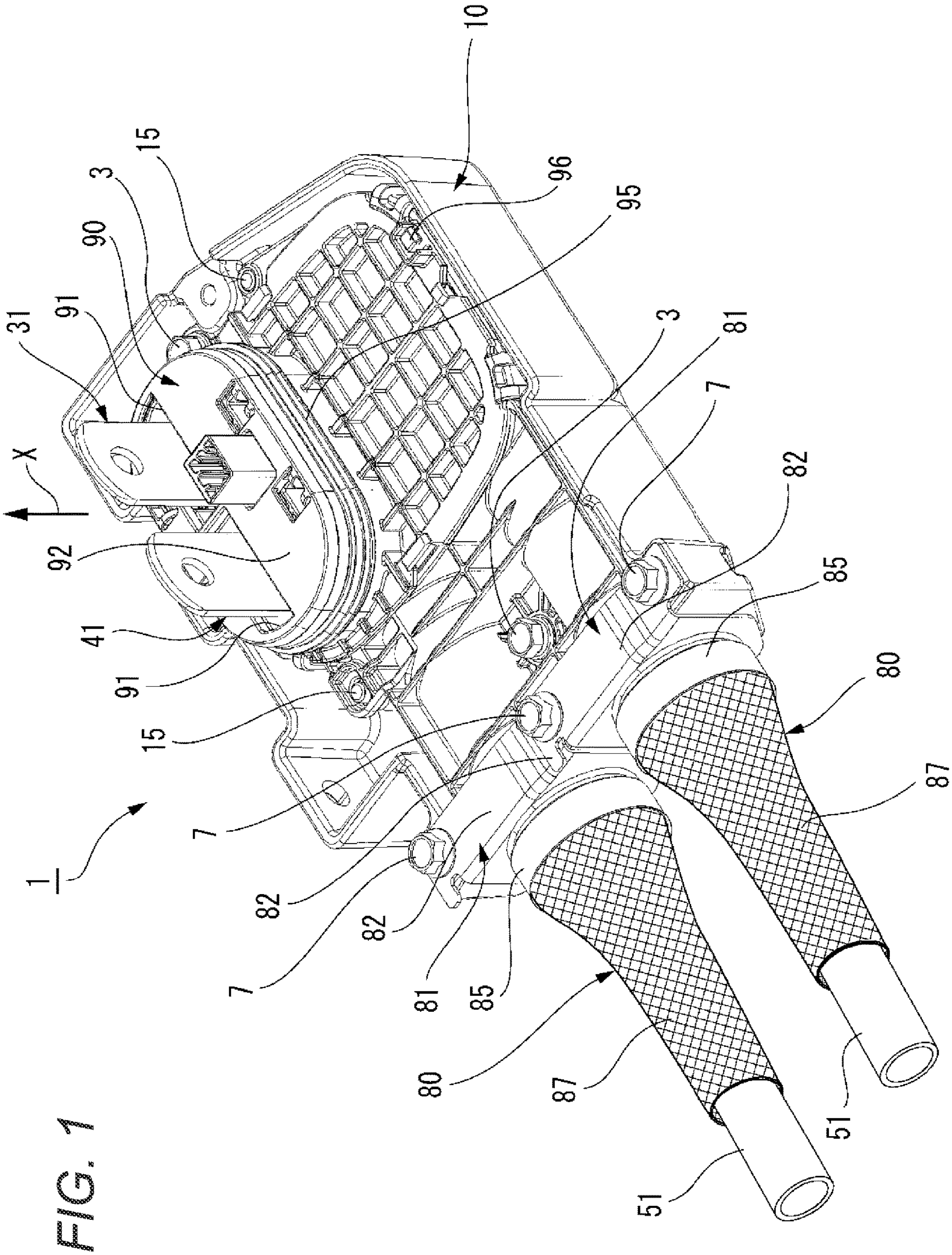
FIG. 1 is a perspective view of a shielded connector according to an embodiment of the presently disclosed subject matter.
Figure 2:
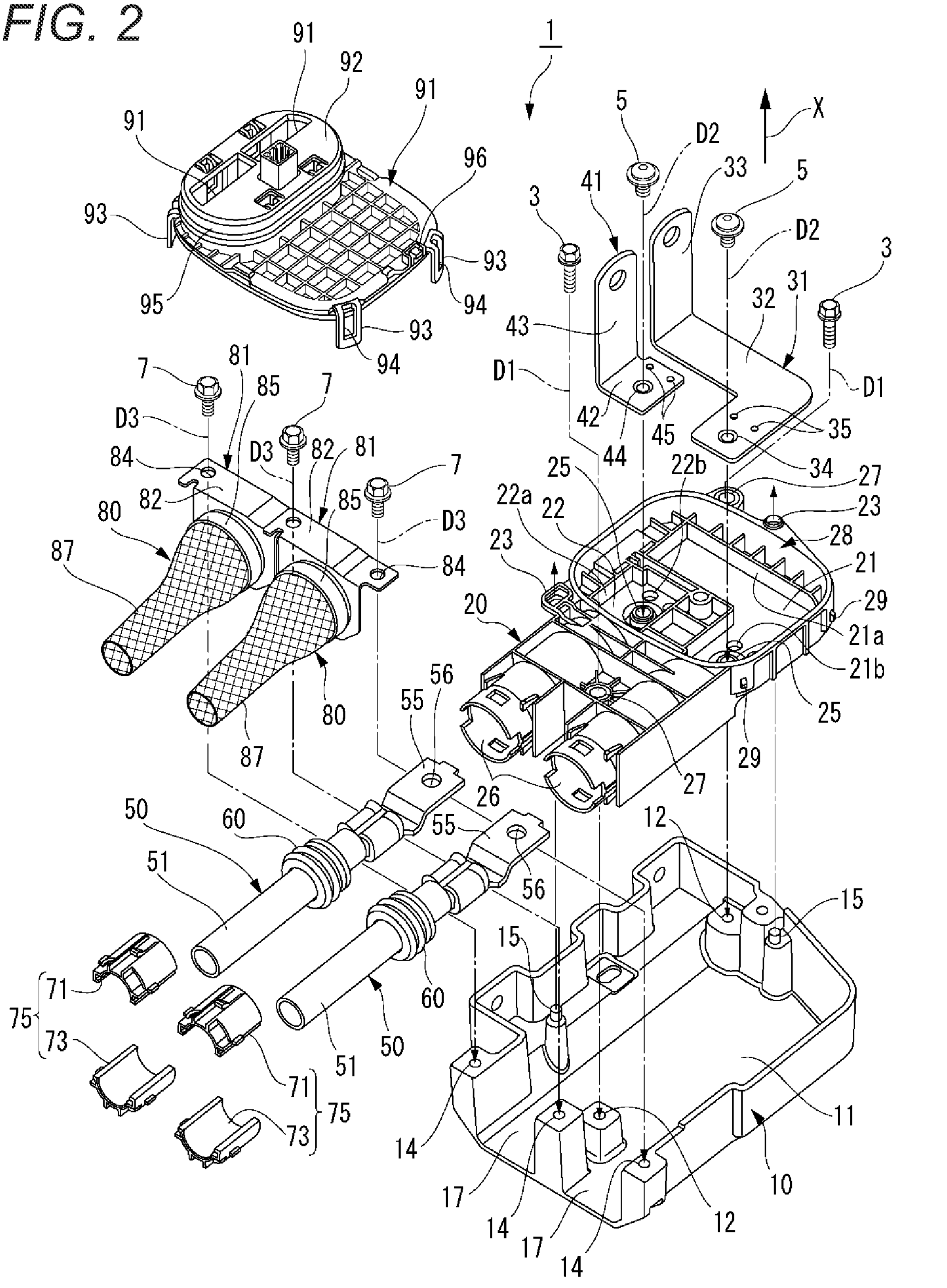
FIG. 2 is an exploded perspective view of the shielded connector shown in FIG. 1.

Hereinafter, an example of an embodiment according to the presently disclosed subject matter will be described with reference to the drawings. FIG. 1 is a perspective view of a shielded connector 1 according to an embodiment of the presently disclosed subject matter. FIG. 2 is an exploded perspective view of the shielded connector 1 shown in FIG. 1.

The shielded connector 1 according to the present embodiment is, for example, a shielded connector used in a power supply circuit such as an inverter or a motor of a vehicle such as a hybrid vehicle or an electric vehicle. The shielded connector 1 is fitted and connected to a mating connector provided in a metal casing of a connection counterpart such as an inverter or a motor. As shown in FIGS. 1 and 2, the shielded connector 1 according to the present embodiment includes an upper shielding shell 10 as a first shielding shell, a housing 20, two bus bars 31 and 41 as terminals, two terminal-equipped electric wires 50, two electric wire shielding members 80, and first to third fastening members 3, 5, and 7.

The housing 20 has a front opening portion 28 that opens forward in a fitting direction (first direction) X (see FIG. 2) with a mating connector (not shown), and tubular electric wire insertion portions 26 that are opened in a direction (second direction) intersecting the front opening portion 28. An inner housing 90 formed with a connector fitting portion 92 fitted to the mating connector is assembled to the front opening portion 28. The housing 20 and the inner housing 90 are formed of synthetic resin having electrical insulation properties. When the inner housing 90 is assembled, the front opening portion 28 of the housing 20 is covered with the inner housing 90.

As shown in FIG. 2, the housing 20 is formed with two terminal accommodating portions 21 and 22 that are exposed to a front side of the fitting direction X by the front opening portion 28, and two electric wire insertion portions 26 and 26 that respectively communicate with the terminal accommodating portions 21 and 22 and are opened in the direction intersecting the front opening portion 28.

Figure 4:
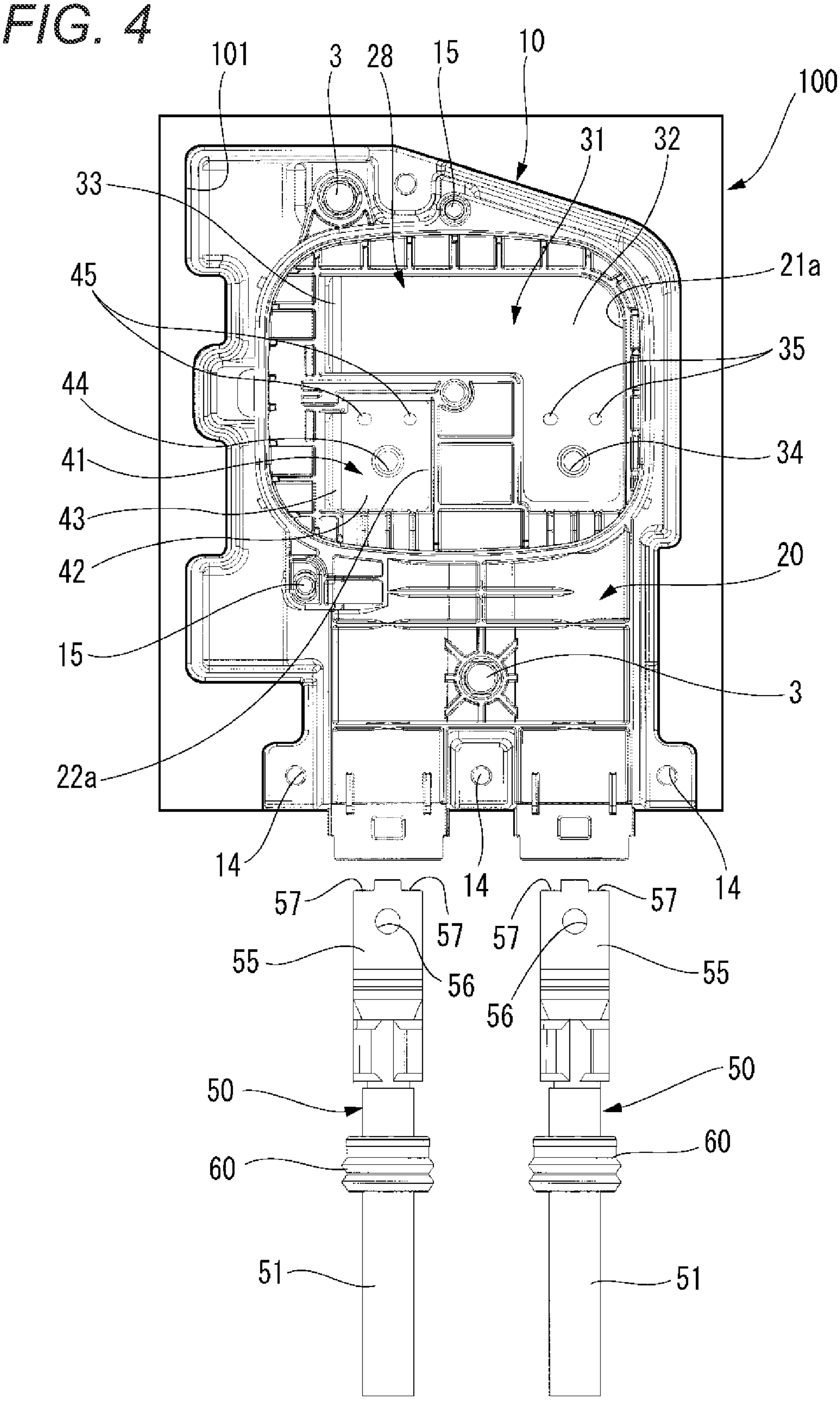
FIG. 4 is a plan view illustrating a terminal arranged in a terminal accommodating portion of the housing.

As shown in FIG. 4, the terminal accommodating portion 21 is an L-shaped recess in which a placement portion 32 of the bus bar 31 is accommodated, and is surrounded by a peripheral wall 21*a*, The peripheral wall 21*a* positions the bus bar 31 by fitting the peripheral wall 21*a* corresponding to an L-shaped outer shape of the placement portion 32 of the bus bar 31. However, the peripheral wall 21*a* has a predetermined clearance between the peripheral wall 21*a* and an end edge of the placement portion 32 along an opening direction (vertical direction in FIG. 4) of the electric wire insertion portion 26, but has almost no clearance between the peripheral wall 21*a* and the end edge of the placement portion 32 along a direction (horizontal direction in FIG. 4) orthogonal to the opening direction of the electric wire insertion portion 26, Therefore, the bus bar 31 is positioned with respect to the opening direction of the electric wire insertion portion 26, and is displaceable by the clearance with respect to the direction orthogonal to the opening direction of the electric wire insertion portion 26.

A nut 25 with which the second fastening member 5 is screwed is press-fitted and fixed to a bottom portion of the terminal accommodating portion 21. An escape recess 21*b* for avoiding interference with a positioning pin 108 of a terminal positioning jig 105 to be described later is formed in the bottom portion of the terminal accommodating portion 21 on an opposite side of the electric wire insertion portion 26 across the nut 25.

The terminal accommodating portion 22 is a rectangular recess in which the placement portion 42 of the bus bar 41 is accommodated, and is surrounded by the peripheral wall 22*a*. The peripheral wall 22*a* positions the bus bar 41 by fitting the peripheral wall 22*a* corresponding to a rectangular outer shape of the placement portion 42 of the bus bar 41. However, the peripheral wall 22*a* has the predetermined clearance between the peripheral wall 22*a* and the end edge of the placement portion 42 along the opening direction of the electric wire insertion portion 26, but has almost no clearance between the peripheral wall 22*a* and the end edge of the placement portion 42 along the direction orthogonal to the opening direction of the electric wire insertion portion 26. Therefore, the bus bar 41 is positioned with respect to the opening direction of the electric wire insertion portion 26, and is displaceable by the clearance with respect to the direction orthogonal to the opening direction of the electric wire insertion portion 26.

The nut 25 with which the second fastening member 5 is screwed is press-fitted and fixed to a bottom portion of the terminal accommodating portion 22. An escape recess 22*b* for avoiding interference with the positioning pin 108 of the terminal positioning jig 105 to be described later is formed in the bottom portion of the terminal accommodating portion 22 on the opposite side of the electric wire insertion portion 26 across the nut 25.

A metal tubular collar 27 through which the first fastening member 3 penetrates along the fitting direction X is insert-molded in a gap portion between the two electric wire insertion portions 26 and 26 and an outer end portion on the opposite side of the wire insertion portion 26 in the housing 20. Two positioning holes 23 and 23 are provided on an outer peripheral portion of the housing 20 at predetermined intervals from each other, and a plurality of locking claws 29 are formed on an outer surface of a peripheral wall defining the front opening portion 28.

As shown in FIG. 2, the inner housing 90 is formed in a plate shape having an outer shape corresponding to the front surface opening 28 of the housing 20, and is assembled from a front surface side to cover the front opening portion 28 of the housing 20. Accordingly, the front opening portion 28 of the housing 20 is closed by the inner housing 90.

A plurality of locking pieces 93 having locking holes 94 are formed on an peripheral edge of the inner housing 90. The locking claws 29 formed on the housing 20 are inserted into the locking holes 94 of the locking pieces 93 by assembling the inner housing 90 to the housing 20. Accordingly, the locking pieces 93 are locked by the locking claws 29, and the inner housing 90 is held in a state of being assembled to the housing 20.

The inner housing 90 is formed with the connector fitting portion 92 fitted to the mating connector. The connector fitting portion 92 is formed in an elongated tubular shape protruding along the fitting direction X. Terminal insertion ports 91 and 91 into which distal portions of the bus bars 31 and 41 are inserted, respectively, are formed in the front of the connector fitting portion 92. Further, a packing 95 is assembled to an outer peripheral portion of the connector fitting portion 92.

The upper shielding shell 10 is a shielding member that covers and electromagnetically shields a rear surface side and an outer peripheral surface side of the housing 20 on an opposite side of the front opening portion 28. The upper shielding shell 10 is formed of a conductive metal material. The upper shielding shell 10 defines an accommodation space 11 for accommodating the housing 20.

Positioning projections 15 and 15 corresponding to the positioning holes 23 and 23 of the housing 20 are provided on a bottom surface of the upper shielding shell 10. The positioning projections 15 and 15 can be engaged with the positioning holes 23 and 23 to position the housing 20 when the housing 20 is assembled to the upper shielding shell 10. That is, a positioning mechanism for positioning the housing 20 with respect to the upper shielding shell 10 is provided between the upper shielding shell 10 and a rear surface of the housing 20.

Further, the upper shielding shell 10 is formed with two screw holes 12 into which the first fastening members 3 are screwed, the first fastening members 3 being inserted through the tubular collar 27 of the housing 20. Three screw holes 14 into which third fastening members 7 for fastening the two electric wire shielding members 80 are respectively screwed are formed in a vicinity of a lead-out groove 17 of the upper shielding shell 10 from which the electric wire insertion portions 26 and 26 of the housing 20 are led out.

The bus bar 31 includes the L-shaped placement portion 32 placed on the terminal accommodating portion 21 of the housing 20, and a distal portion 33 that is vertically provided from one end of the placement portion 32 and protrudes from the connector fitting portion 92 of the inner housing 90 along the fitting direction X. The bus bar 31 is formed of, for example, a conductive metal material such as copper, a copper alloy, aluminum, or an aluminum alloy. The other end of the placement portion 32 is formed with an attachment hole 34 through which the second fastening member 5 is inserted and a pair of terminal positioning holes 35 into which a pair of positioning pins 108 of the terminal positioning jig 105 are inserted.

The bus bar 41 includes the rectangular placement portion 42 placed on the terminal accommodating portion 22 of the housing 20, and a distal portion 43 that is vertically provided from one end of the placement portion 42 and protrudes from the connector fitting portion 92 of the inner housing 90 along the fitting direction X. The bus bar 41 is formed of, for example, a conductive metal material such as copper, a copper alloy, aluminum, or an aluminum alloy. The placement portion 42 is formed with an attachment hole 44 through which the second fastening member 5 is inserted and a pair of terminal positioning holes 45 into which the positioning pins 108 of the terminal positioning jig 105 are inserted.

The terminal-equipped electric wire 50 includes an electric wire 51 and a connection terminal 55 connected to a terminal of the electric wire 51. The connection terminal 55 is formed of, for example, a conductive metal material such as copper, a copper alloy, aluminum, or an aluminum alloy. One end of the connection terminal 55 is a crimping portion connected to the terminal of the electric wire 51, and the other end of the connection terminal 55 is a flat plate-shaped electrical connection portion fastened to the placement portion 32 of the bus bar 31 or the placement portion 42 of the bus bar 41. The connection terminal 55 includes an attachment hole 56 which is drilled in the plate-shaped electrical connection portion and through which the second fastening member 5 is inserted, and a pair of step portions 57 and 57 which are formed at a distal end of the electrical connection portion and abut against the positioning pins 108 of the terminal positioning jig 105 (see FIG. 4).

The electric wire 51 is an insulated electric wire in which an outer periphery of a conductor is covered with a sheath, and the conductor is exposed from the sheath at an end portion of the electric wire 51. An electric wire crimping portion of the connection terminal 55 is crimped to the conductor of the electric wire 51. Accordingly, the electric wire 51 is electrically connected to the connection terminal 55.

In the terminal-equipped electric wire 50 assembled to the housing 20, the connection terminal 55 connected to the terminal of the electric wire 51 is inserted into the housing 20 from the electric wire insertion portion 26 of the housing 20. A waterproof member 60 is attached to each electric wire 51 of the terminal-equipped electric wire 50, and a gap between the electric wire 51 and an inner peripheral surface 26*a* of the electric wire insertion portion 26 is sealed by the waterproof member 60 (see FIG. 10). A split rear holder 75 attached to an open end of the electric wire insertion portion 26 prevents the waterproof member 60 from coming off or falling in the wire insertion portion 26. The rear holder 75 prevents bending of the electric wire 51 on an outer side of the waterproof member 60.

The electric wire shielding member 80 includes a lower shielding shell 81 as a second shielding shell electrically connected to the upper shielding shell 10, and a braid 87 covering the electric wire 51 led out from the electric wire insertion portion 26. The lower shielding shell 81 has a shell fixing portion 82 fastened to the upper shielding shell 10 by the third fastening member 7, and a braid connection portion 83 (see FIG. 10) to which one end of the braid 87 is connected. The lower shielding shell 81 is formed of a conductive metal material. Attachment holes 84 through which the third fastening members 7 are inserted are formed at both ends of the shell fixing portions 82. An open end of the braid 87 through which the electric wire 51 is passed is externally fitted to the tubular braid connection portion 83, and is fixed and electrically connected to the tubular braid connection portion 83 by a shield ring 85.

The first fastening member 3 that fastens the housing 20 to the upper shielding shell 10 is, for example, a bolt. The second fastening member 5 that fastens the other end (electrical connection portion) of the connection terminal 55 to the placement portion 32 of the bus bar 31 or the placement portion 42 of the bus bar 41 is, for example, a screw. Further, the third fastening member 7 that fastens the shell fixing portion 82 of the lower shielding shell 81 to the upper shielding shell 10 is, for example, a bolt.

Figure 3:
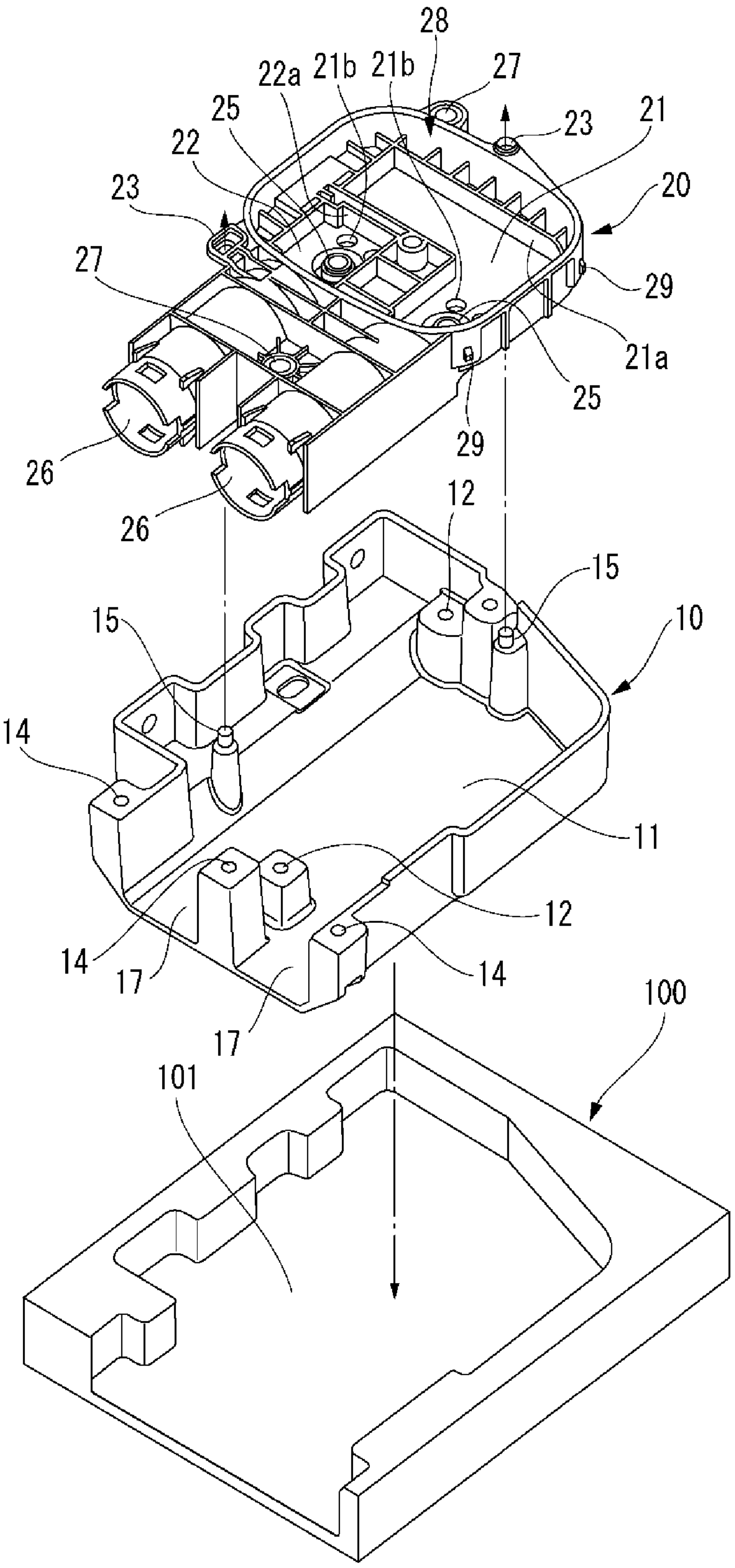
FIG. 3 is a perspective view illustrating a first shielding shell assembled to a housing.

Next, a case of assembling the shielded connector 1 according to the present embodiment will be described with reference to FIGS. 3 to 8. First, as shown in FIG. 3, the upper shielding shell 10 is set in an assembly jig 100 from a rear surface side. The assembly jig 100 has a holding recess 101 corresponding to an outer shape of the upper shielding shell 10, and holds the upper shielding shell 10 set with the accommodation space 11 facing upward.

The housing 20 is assembled into the accommodation space 11 of the upper shielding shell 10 set in the assembly jig 100. At this time, by engaging the positioning projections 15 and 15 of the upper shielding shell 10 with the positioning holes 23 and 23, the housing 20 is positioned when the housing 20 is assembled to the upper shielding shell 10. Therefore, positioning of the housing 20 with respect to the upper shielding shell 10 is facilitated, and workability in fastening the first fastening member 3 is improved.

The housing 20 is fastened to the upper shielding shell 10 from the rear surface side by the first fastening member 3. The first fastening member 3 penetrates the tubular collar 27 of the housing 20 and is screwed into the screw hole 12 of the upper shielding shell 10, thereby fastening the housing 20 to the upper shielding shell 10.

Next, as shown in FIG. 4, the bus bars 31 and 41 are respectively arranged in the terminal accommodating portions 21 and 22 via the front opening portion 28 of the housing 20. The bus bar 31 is positioned in the terminal accommodating portion 21 by fitting the placement portion 32 surrounded by the peripheral wall 21*a* of the terminal accommodating portion 21. The bus bar 41 is positioned in the terminal accommodating portion 22 by fitting the placement portion 42 surrounded by the peripheral wall 22*a* of the terminal accommodating portion 22.

Figure 5:
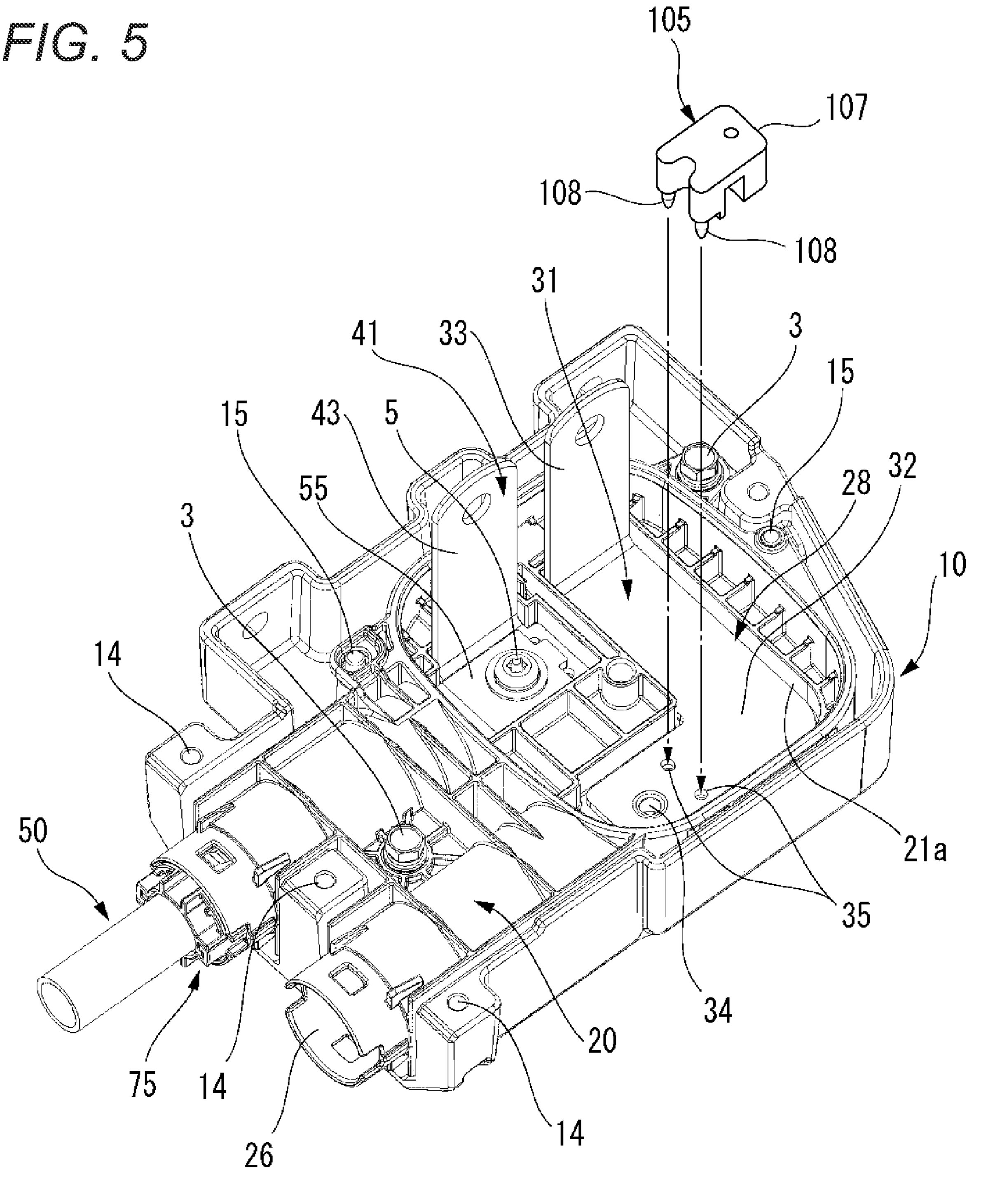
FIG. 5 illustrates a procedure in which the other end of a connection terminal inserted into the housing is fastened to a proximal portion of the terminal and is a perspective view showing a state before a terminal positioning jig is set.
Figure 6:
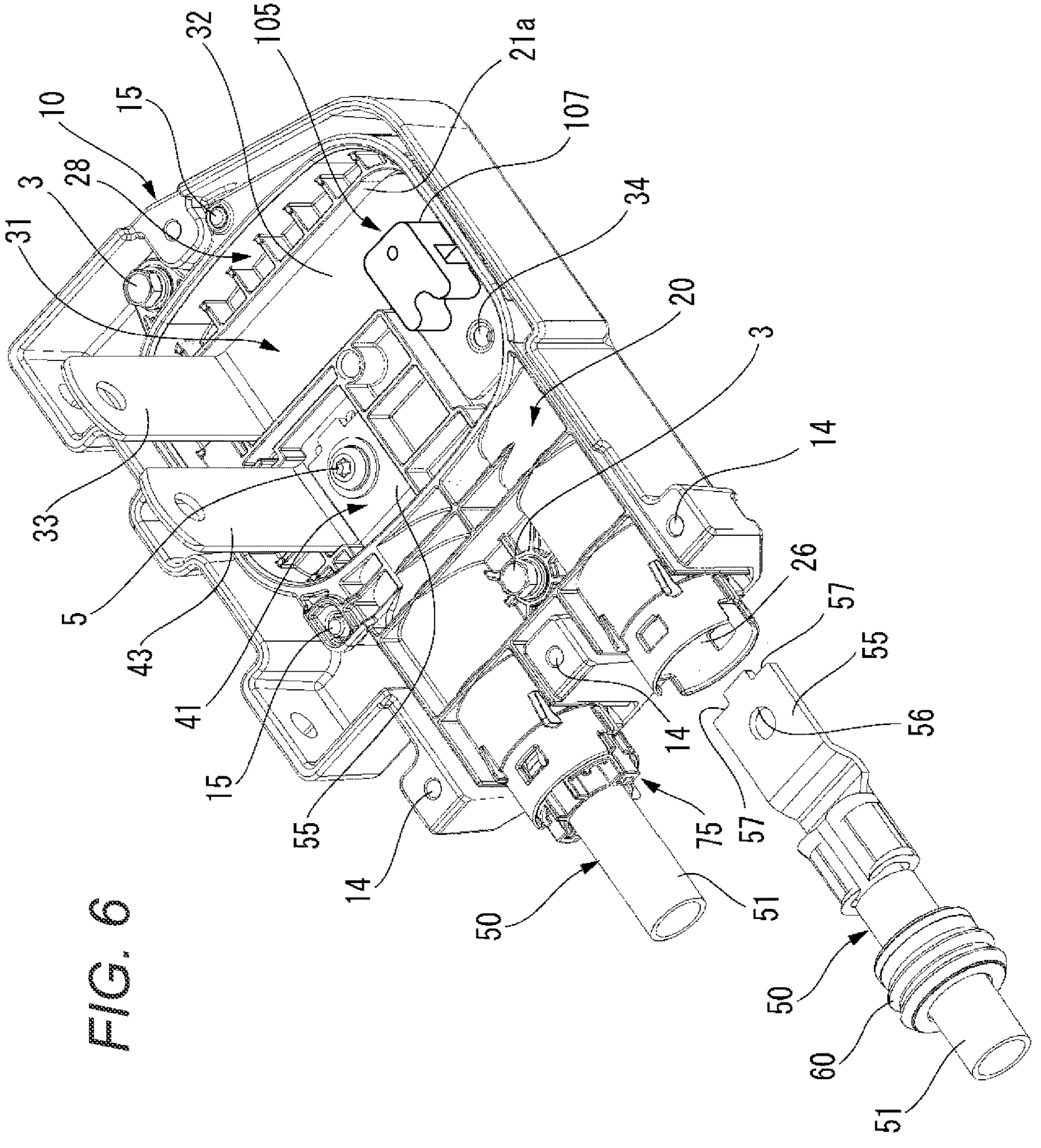
FIG. 6 illustrates the procedure in which the other end of the connection terminal inserted into the housing is fastened to the proximal portion of the terminal and is a perspective view showing a state after the terminal positioning jig is set.

Thereafter, as shown in FIGS. 5 and 6, the connection terminal 55 connected to the terminal of the electric wire 51 is inserted into the housing 20 through the electric wire insertion portion 26 of the housing 20. The electrical connection portion of the connection terminal 55 inserted from the electric wire insertion portion 26 communicating with the terminal accommodating portion 21 is fastened to the placement portion 32 of the bus bar 31. The electrical connection portion of the connection terminal 55 inserted from the electric wire insertion portion 26 communicating with the terminal accommodating portion 22 is fastened to the placement portion 42 of the bus bar 41.

Here, in order to fasten the electrical connection portion of each connection terminal 55 to the placement portion 32 of the bus bar 31 or the placement portion 42 of the bus bar 41, the terminal-equipped electric wire 50 has to be inserted into the housing 20 such that the attachment hole 56 of the connection terminal 55 overlaps with the attachment hole 34 of the placement portion 32 or the attachment hole 44 of the placement portion 42. Therefore, when the terminal-equipped electric wire 50 is inserted into the housing 20, the terminal positioning jig 105 is used.

The terminal positioning jig 105 includes a main body 107 and a pair of positioning pins 108 projecting from a lower surface of the main body 107. Each of the pair of positioning pins 108 has a length such that a side surface thereof abuts against each of the pair of step portions 57 and 57 formed at a distal end of the connection terminal 55, and a distal portion thereof is fitted into the terminal positioning hole 35 of the bus bar 31 or the terminal positioning hole 45 of the bus bar 41. The pair of positioning pins 108 have an interval capable of sandwiching a convex portion formed between the pair of step portions 57 and 57.

For example, when the terminal-equipped electric wire 50 is inserted into the housing 20 such that the attachment hole 56 of the connection terminal 55 overlaps with the attachment hole 34 of the placement portion 32, the positioning jig 105 is set on the placement portion 32 of the bus bar 31 in advance, as shown in FIG. 6. At this time, in the positioning jig 105, a bottom surface of the main body 107 is placed on the placement portion 32, and the distal portion of the positioning pin 108 is fitted into the terminal positioning hole 35 of the bus bar 31.

Figure 7:
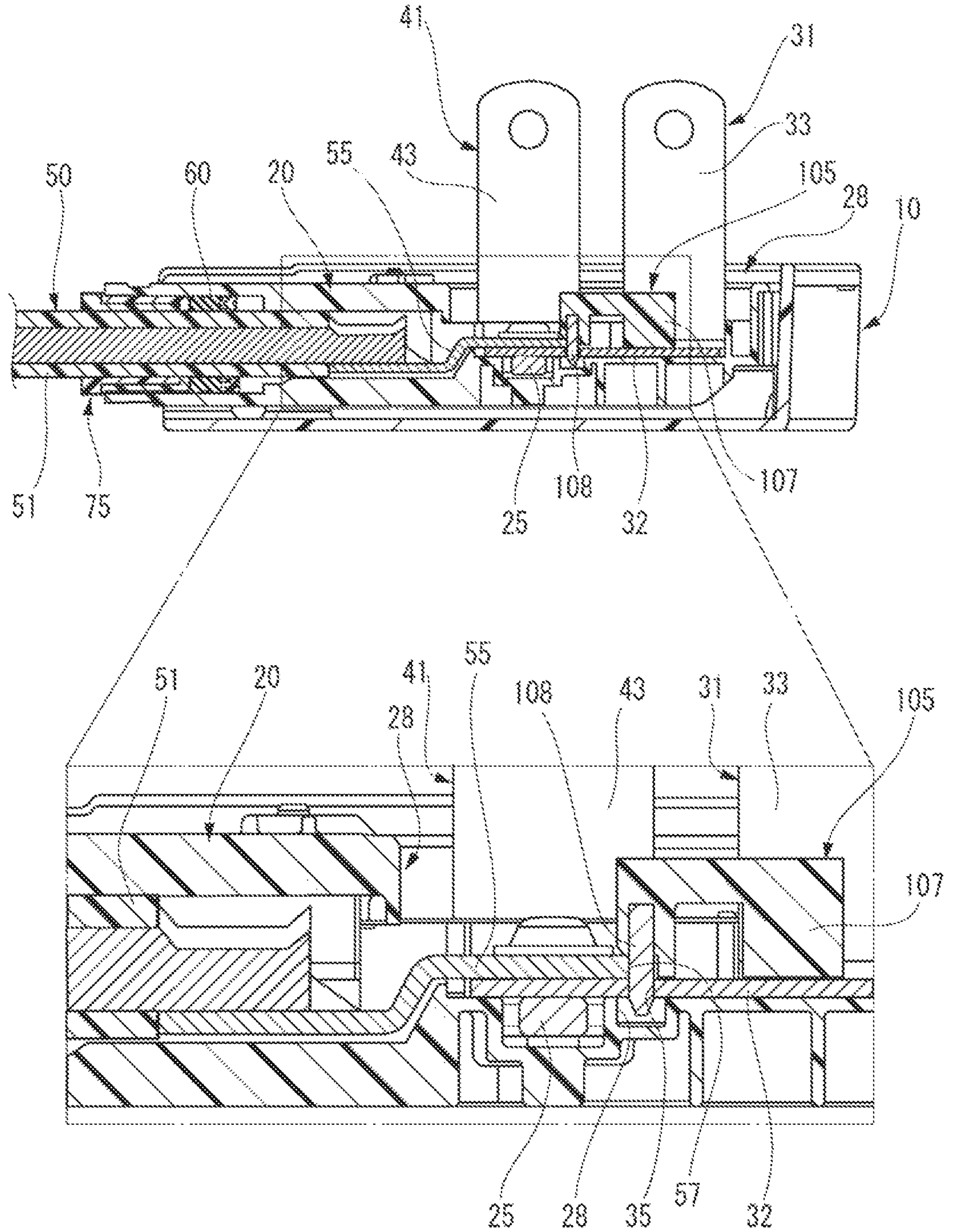
FIG. 7 illustrates the procedure in which the other end of the connection terminal inserted into the housing is fastened to the proximal portion of the terminal, and is a longitudinal sectional view showing a state where the connection terminal is positioned with respect to an opening direction of an electric wire insertion portion by the terminal positioning jig, and an enlarged view of a main part of the same.

As shown in FIG. 7, when the terminal-equipped electric wire 50 is inserted into the housing 20, the step portion 57 of the connection terminal 55 abuts against a side surface of the positioning pin 108, thereby restricting insertion of the connection terminal 55. When the step portion 57 of the connection terminal 55 abuts against the side surface of the positioning pin 108, the terminal positioning hole 35 is drilled such that the attachment hole 56 of the connection terminal 55 overlaps with the attachment hole 34 of the placement portion 32. Therefore, only by inserting the terminal-equipped electric wire 50 into the housing 20 until the step portion 57 of the connection terminal 55 abuts against the side surface of the positioning pin 108, the attachment hole 56 of the connection terminal 55 can overlap with the attachment hole 34 of the placement portion 32.

Therefore, the second fastening member 5 is easily inserted through the attachment hole 56 and the attachment hole 34, and then screwed into the nut 25 press-fitted and fixed to the bottom portion of the terminal accommodating portion 21, so that the electrical connection portion of the connection terminal 55 can be fastened to the placement portion 32 of the bus bar 31. Similarly, the positioning jig 105 can be used when the terminal-equipped electric wire 50 is inserted into the housing 20 such that the attachment hole 56 of the connection terminal 55 overlaps with the attachment hole 44 of the placement portion 42.

Figure 8:
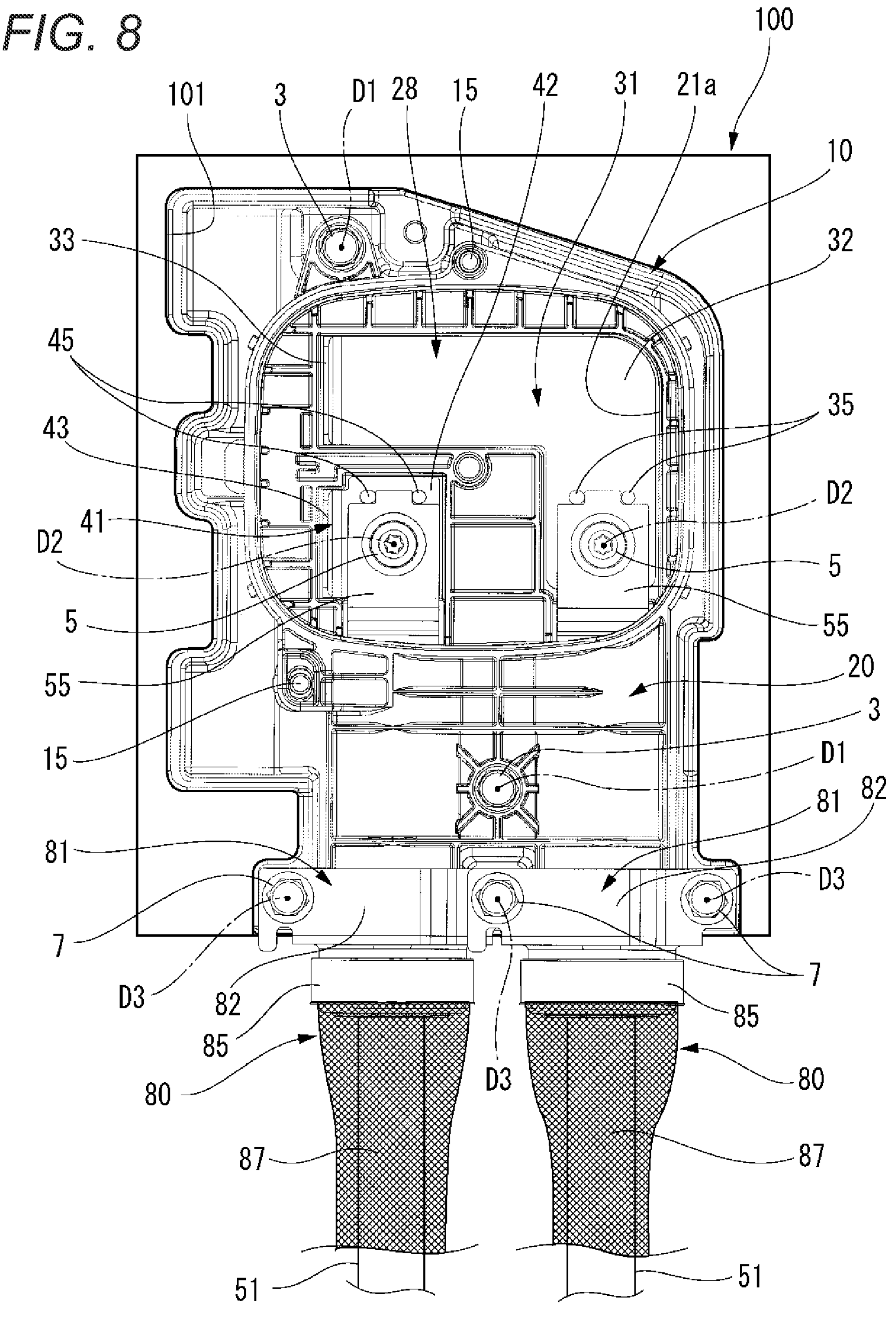
FIG. 8 is a plan view showing a state where a second shielding shell to which a braid is connected is fastened to the first shielding shell.

Next, as shown in FIG. 8, the electric wire shielding member 80 is fastened in the vicinity of the lead-out groove 17 (see FIG. 2) of the upper shielding shell 10. Specifically, the shell fixing portion 82 of the lower shielding shell 81 in which the braid 87 covering the electric wire 51 is connected to the braid connection portion 83 is fastened by the third fastening member 7 screwed into the screw hole 14 (see FIG. 2) of the upper shielding shell 10.

The two lower shielding shells 81 are adjacently fastened to the upper shielding shell 10. Therefore, by fastening the third fastening members 7 by overlapping the attachment holes 84 formed in end portions of adjacent shell fixing portions 82, the number of the third fastening members 7 can be reduced, and the lower shielding shells 81 can be electrically connected to each other.

As shown in FIGS. 2 and 8, the first fastening member 3, the second fastening member 5, and the third fastening member 7 respectively have fastening directions D1, D2, and D3 parallel to each other, and are fastened from a front surface side of the housing 20. Therefore, when assembling the shielded connector 1, an operator can fasten all of the first fastening member 3, the second fastening member 5, and the third fastening member 7 from the same direction (from the front surface side of the housing 20), and can visually check a fastening state collectively, and assembling workability is improved. Finally, as shown in FIG. 1, the inner housing 90 covering the front opening portion 28 is attached to the housing 20, and the assembly of the shielded connector 1 is completed.

In the shielded connector 1 according to the present embodiment, since the first shielding shell, the housing, the terminal, the connection terminal, and the second shielding shell are integrally fixed by the first to third fastening members and assembled, handling (handleability) until the shielded connector 1 is fitted to the mating connector is good.

According to the shielded connector 1 of the present embodiment, as shown in FIG. 4, the bus bar 31 arranged in the terminal accommodating portion 21 of the housing 20 is positioned with respect to the opening direction (vertical direction in FIG. 4) of the electric wire insertion portion 26, and is displaceable by the clearance with respect to the direction (horizontal direction in FIG. 4) orthogonal to the opening direction of the electric wire insertion portion 26, Therefore, when the other end of the connection terminal 55 is fastened to the placement portion 32 of the bus bar 31 by the second fastening member 5, assembly tolerance of the bus bar 31 and the connection terminal 55 can be absorbed, and the workability in fastening the second fastening member 5 is improved. When the shielded connector 1 is fitted to the mating connector, fitting tolerance of the bus bar 31 with respect to a mating terminal can also be absorbed, and an increase in a connector fitting force can also be suppressed. The same applies to the bus bar 41 arranged in the terminal accommodating portion 22 of the housing 20.

Figure 9A:
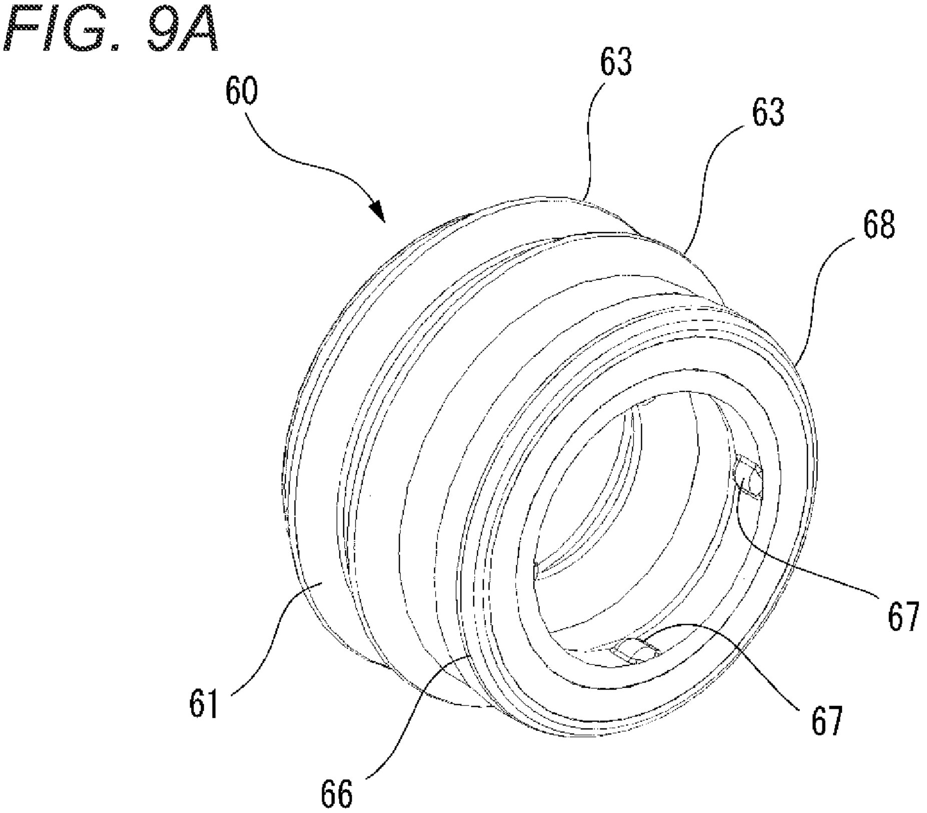
FIGS. 9A and 9B are a perspective view and a cross-sectional perspective view of a waterproof member that seals a gap between the electric wire insertion portion and an electric wire in a watertight manner, respectively.
Figure 9B:
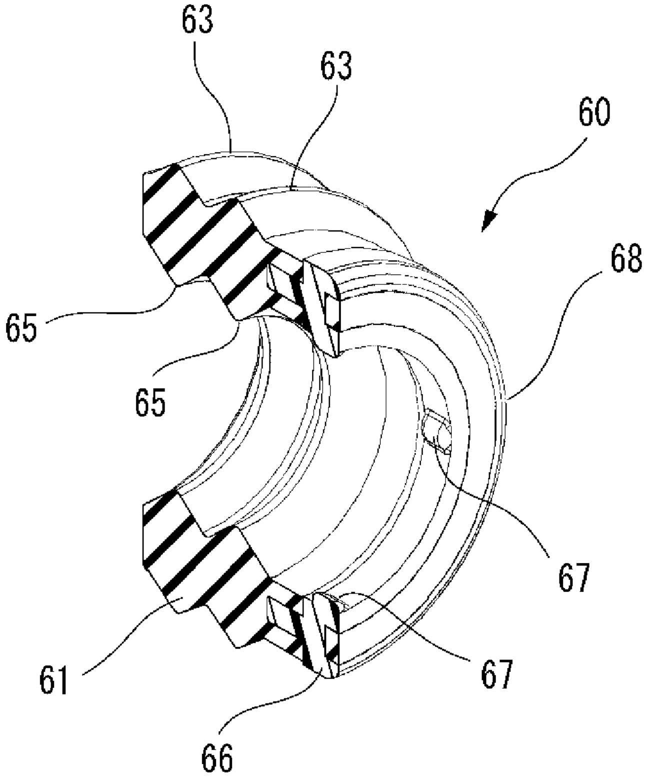

FIGS. 9A and 9B are a perspective view and a cross-sectional perspective view of the waterproof member 60 that seals a gap between the electric wire insertion portion 26 and the electric wire 51 in a watertight manner, respectively. As shown in FIGS. 9A and 9B, the waterproof member 60 includes an annular rubber portion 61 and an annular resin portion 66. The rubber portion 61 has two inner seal portions 65 and 65 that contact in a pressed manner an outer peripheral surface of the electric wire 51 and two outer seal portions 63 and 63 that contact in a pressed manner the inner peripheral surface (first inner peripheral surface) 26*a* of the electric wire insertion portion 26.

The resin portion 66 integrally has a plurality of abutting portions 67 abutting against the outer peripheral surface of the electric wire 51 and an outer annular portion 68 abutting against an inner peripheral surface (second inner peripheral surface) 26*b* of a narrowed portion provided on the inner peripheral surface 26*a* of the terminal accommodating portion 21 (22) side in the electric wire insertion portion 26, and is insert-molded in the rubber portion 61. The abutting portion 67 and the outer annular portion 68 do not necessarily abut against the outer peripheral surface of the electric wire 51 and the inner peripheral surface 26*b* of the narrowed portion, respectively, and may have a slight gap. Four abutting portions 67 are provided at equal intervals in a circumferential direction of the resin portion 66, and have a projecting height lower than a height of the inner seal portion 65. The outer annular portion 68 has an outer diameter smaller than an outer diameter of the outer seal portion 63.

Figure 10:
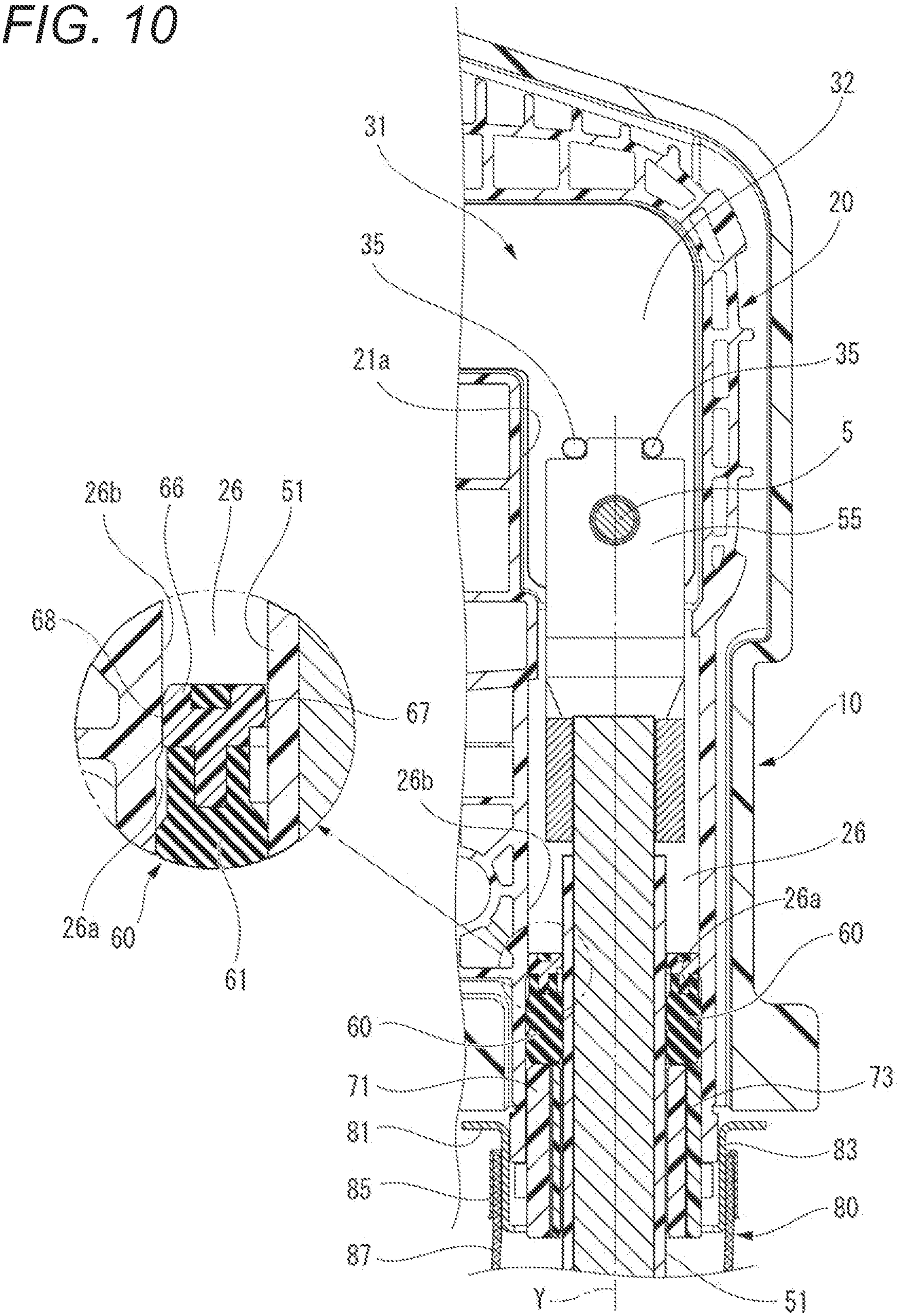
FIG. 10 is a horizontal sectional view showing a waterproof member inserted between the electric wire insertion portion and the electric wire, and an enlarged view of a main part of the same.

As shown in FIG. 10, the waterproof member 60 inserted between the electric wire insertion portion 26 and the electric wire 51 can seal a gap between the electric wire insertion portion 26 and the electric wire 51 in a watertight manner by the rubber portion 61. Further, the connection terminal 55 fastened to the placement portion 32 (42) of the bus bar 31 (41), which is displaceable with respect to the direction (left-right direction in FIG. 10) orthogonal to the opening direction of the electric wire insertion portion 26, may be displaced in the direction orthogonal to the opening direction of the wire insertion portion 26 when the second fastening member 5 is fastened, when the shielded connector is fitted to the mating connector, or the like.

Figure 11:
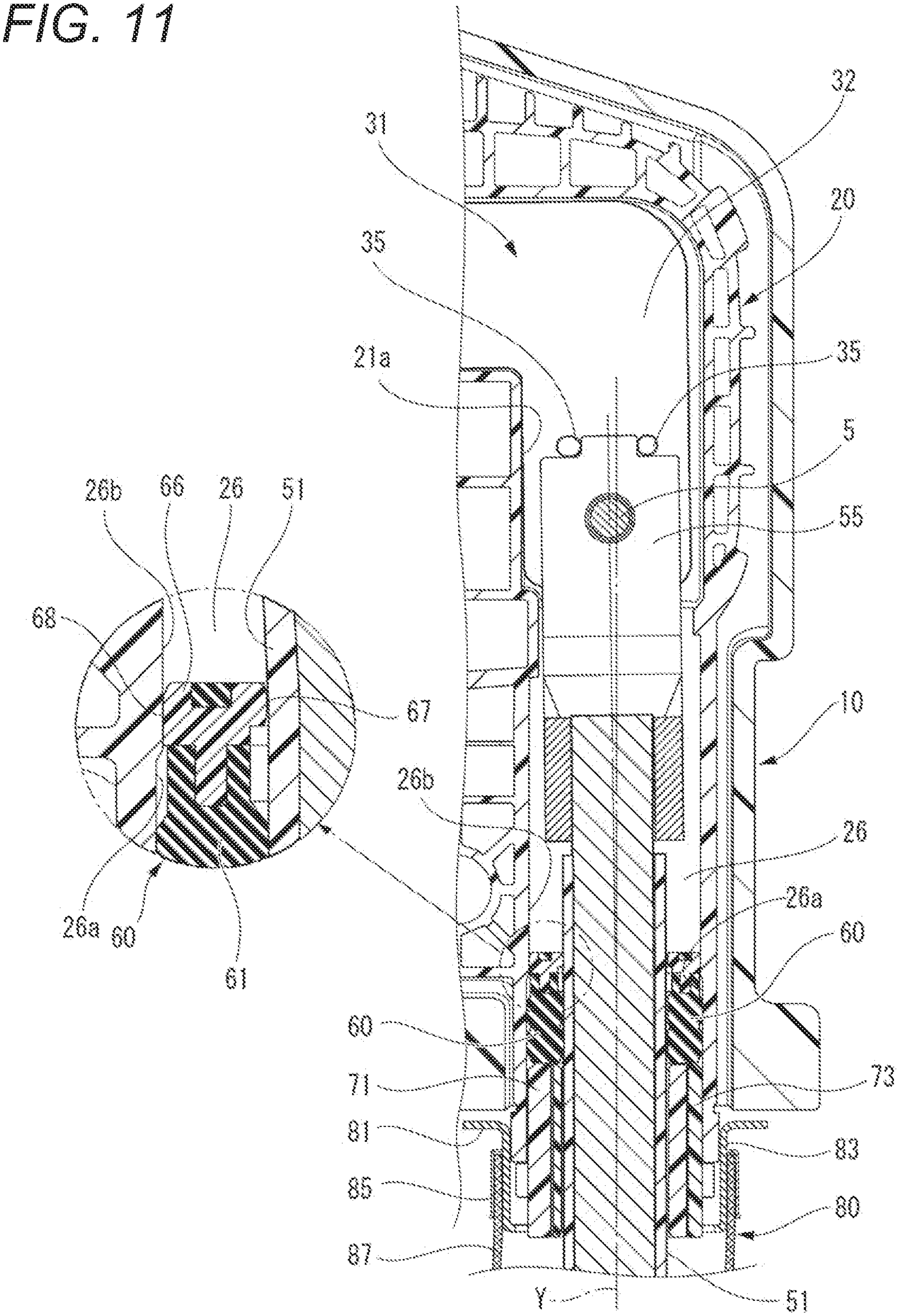
FIG. 11 is a horizontal sectional view showing a waterproof member in a state where the electric wire is eccentric with respect to an opening central axis of the electric wire insertion portion, and an enlarged view of a main part of the same.

As shown in FIG. 11, when the connection terminal 55 is displaced in the direction (left direction in FIG. 11) orthogonal to the opening direction of the electric wire insertion portion 26, a force eccentric to the left direction with respect to an opening central axis Y of the electric wire insertion portion 26 acts on the electric wire 51 whose terminal is connected to the connection terminal 55. However, when the electric wire 51 is eccentric to the left direction with respect to the opening central axis Y of the electric wire insertion portion 26, an eccentricity of the electric wire 51 with respect to the opening central axis Y of the electric wire insertion portion 26 is regulated by the resin portion 66 of the waterproof member 60 in which the opposing abutting portion 67 abuts against the outer peripheral surface of the electric wire 51 and the outer annular portion 68 abuts against the inner peripheral surface 26*b* of the narrowed portion. Therefore, with the rubber portion 61 of the waterproof member 60 having the inner seal portion 65 and the outer seal portion 63, it is possible to reduce the influence of the eccentricity (deviation) of the electric wire 51, and it is possible to suppress a decrease in seal performance.

Figure 12:
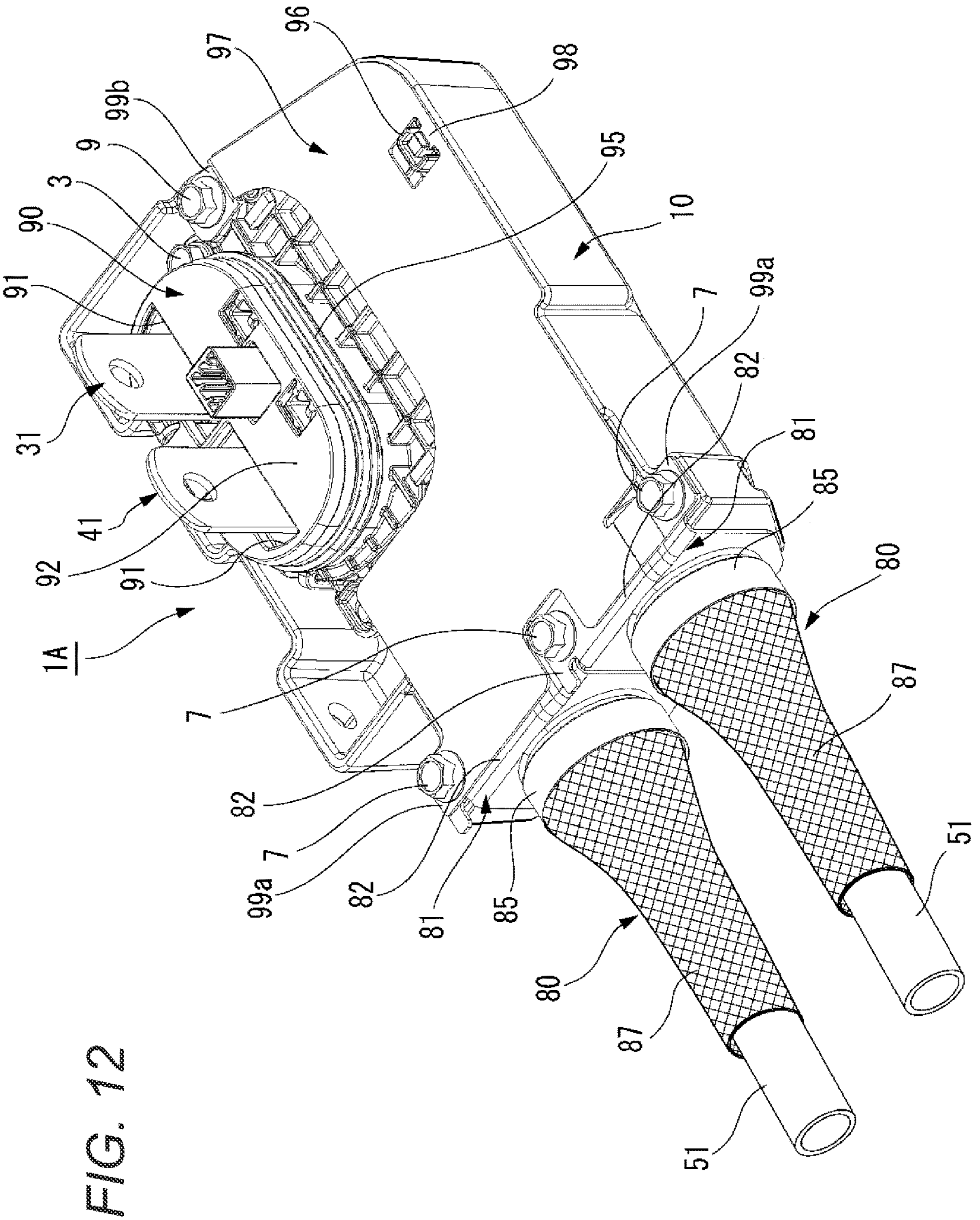
FIG. 12 is a perspective view of a shielded connector according to another embodiment of the presently disclosed subject matter.

FIG. 12 is a perspective view of a shielded connector 1A according to another embodiment of the presently disclosed subject matter. In the shielded connector 1A, the same components as those of the shielded connector 1 according to the embodiment are denoted by the same reference numerals, and a detailed description thereof will be omitted. The shielded connector 1A is provided with a front shielding shell 97 as a third shielding shell that covers the front surface side of the housing 20 excluding the connector fitting portion 92.

The front shielding shell 97 is a shielding member that covers and electromagnetically shields the front surface side of the inner housing 90 excluding the connector fitting portion 92. The front shielding shell 97 is formed of a conductive metal material. A locking piece 98 is locked to a locking portion 96 formed in the inner housing 90, two locking pieces 99*a* are fastened together to the third fastening members 7, and a locking piece 99*b* is fastened to a fastening member 9, whereby the front shielding shell 97 is fixed to the front surface side of the inner housing 90.

According to the shielded connector 1A of the present embodiment, when the shielded connector 1A is not assembled such that the front surface side of the housing 20 faces a metal casing of a connection counterpart (not shown), shielding properties of the shielded connector 1A can be secured by covering the front surface side of the housing 20 with the front shielding shell 97. In other words, in a case of the shielded connector 1 assembled such that the front surface side of the housing 20 faces the metal casing of the connection counterpart, the shielding properties can be secured without covering the front surface side of the housing 20 with the front shielding shell 97.

Therefore, according to the shielded connectors 1 and 1A according to the above embodiments, it is possible to provide a shielded connector which is easy to handle and can improve assembling workability.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

According to an aspect of the embodiments described above, a shielded connector (1, 1A) includes a housing (20) having a front opening portion (28) configured to be covered by an inner housing (90) in which a connector fitting portion (92) configured to be fitted to a mating connector is formed, and an electric wire insertion portion (26) having a tubular shape and opened in a second direction intersecting a first direction in which the front opening (28) opens, a terminal (for example, bus bar 31, 41) configured to be accommodated in a terminal accommodating portion (21, 22) of the housing (20) and having a distal portion configured to be connected to a mating terminal, a connection terminal (55) having one end configured to be connected to an end of an electric wire (51), a first shielding shell (for example, upper shielding shell 10) configured to cover a rear surface of the housing (20) opposite to a front surface of the housing (20) on which the front opening portion (28) is provided, a second shielding shell (for example, lower shielding shell 81) having a braid connection portion (83) to which a braid (87) covering the electric wire (51) led out from the electric wire insertion portion (26) is to be connected, and a shell fixing portion (82) configured to be electrically connected to the first shielding shell (upper shielding shell 10), a first fastening member (3) configured to fasten the housing (20) to the first shielding shell (upper shielding shell 10), a second fastening member (5) configured to fasten the other end of the connection terminal (55) to a placement portion (32, 42) of the terminal (bus bar 31, 41) accommodated in the terminal accommodating portion (21, 22) of the housing (20), and a third fastening member (7) configured to fasten the shell fixing portion (82) of the second shielding shell (lower shielding shell 81) to the first shielding shell (upper shielding shell 10). The first fastening member (3), the second fastening member (5), and the third fastening member (7) have fastening directions (D1, D2, D3) parallel to each other, and are fastened from a front surface side of the housing (20).

When the shielded connector described above is assembled, first, the housing is fastened to the first shielding shell from the rear surface side by the first fastening member. Next, after the terminal is arranged in the terminal accommodating portion of the housing through the front opening portion, the connection terminal whose one end is connected to the terminal of the electric wire is inserted into the housing from the electric wire insertion portion of the housing. The other end of the connection terminal inserted into the housing is fastened to the placement portion of the terminal by the second fastening member. Next, the shell fixing portion of the second shielding shell in which the braid covering the electric wire is connected to the braid connection portion is fastened to the first shielding shell by the third fastening member. The first to third fastening members have fastening directions parallel to each other, and are fastened from the front surface side of the housing. Finally, the inner housing covering the front opening portion is attached to the housing. Therefore, when assembling the shielded connector, an operator can fasten all of the first to third fastening member from the same direction (from the front surface side of the housing), and can visually check a fastening state collectively, and assembling workability is improved. In the shielded connector having the configuration, since the first shielding shell, the housing, the terminal, the connection terminal, and the second shielding shell are integrally fixed by the first to third fastening members and assembled, handling (handleability) until the shielded connector is fitted to the mating connector is good.

A positioning mechanism (for example, positioning projection 15 and positioning hole 23) configured to position the housing (20) with respect to the first shielding shell (upper shielding shell 10) may be provided between the first shielding shell (upper shielding shell 10) and the rear surface of the housing (20).

With this configuration, the positioning mechanism including the positioning projection, the positioning hole, and the like is provided between the first shielding shell and the rear surface of the housing. Therefore, positioning of the housing with respect to the first shielding shell is facilitated, and workability in fastening the first fastening member is improved.

The terminal (bus bar 31, 41) accommodated in the terminal accommodating portion (21, 22) of the housing (20) may be positioned with respect to the second direction and may be displaceable with respect to a direction orthogonal to the second direction.

With this configuration, the terminal arranged in the terminal accommodating portion of the housing is positioned with respect to the opening direction of the electric wire insertion portion, and is displaceable with respect to a direction orthogonal to the opening direction of the electric wire insertion portion. Therefore, when the other end of the connection terminal is fastened to the placement portion of the terminal by the second fastening member, assembly tolerance of the terminal and the connection terminal can be absorbed, and workability in fastening the second fastening member is improved. When the shielded connector is fitted to the mating connector, fitting tolerance of the terminal with respect to a mating terminal can also be absorbed, and an increase in a connector fitting force can also be suppressed.

The shielded connector (1, 1A) may further include a waterproof member (60) configured to be attached to the electric wire (51) and to seal a gap between the electric wire insertion portion (26) and the electric wire (51) in a watertight manner. The waterproof member (60) may include a rubber portion (61) having an inner seal portion (65) configured to contact in a pressed manner an outer peripheral surface of the electric wire (51), and an outer seal portion (63) configured to contact in a pressed manner a first inner peripheral surface (26*a*) of the electric wire insertion portion (26), and a resin portion (66) integrally having a plurality of abutting portions (67) configured to abut against the outer peripheral surface of the electric wire (51) and an outer annular portion (68) configured to abut against a second inner peripheral surface (26*b*) of a narrowed portion provided on the first inner peripheral surface (26*a*) on a side of the electric wire insertion portion (26) connected to the terminal accommodating portion (21, 22), the resin portion (66) being insert-molded in the rubber portion (61).

With this configuration, the gap between the electric wire insertion portion and the electric wire is sealed in a watertight manner by the rubber portion of the waterproof member. Further, the connection terminal fastened to the placement portion of the terminal, which is displaceable with respect to the direction orthogonal to the opening direction of the electric wire insertion portion, may be displaced in the direction orthogonal to the opening direction of the wire insertion portion when the second fastening member is fastened, when the shielded connector is fitted to the mating connector, or the like. When the connection terminal is displaced in the direction orthogonal to the opening direction of the electric wire insertion portion, an eccentric force with respect to an opening central axis of the electric wire insertion portion acts on the electric wire whose terminal is connected to the connection terminal. However, when the electric wire is eccentric with respect to the opening central axis of the electric wire insertion portion, an eccentricity of the electric wire with respect to the opening central axis of the electric wire insertion portion is regulated by the resin portion of the waterproof member in which the plurality of abutting portions abut against the outer peripheral surface of the electric wire and the outer annular portion abuts against the inner peripheral surface of the narrowed portion. Therefore, with the rubber portion of the waterproof member having the inner seal portion and the outer seal portion, it is possible to reduce the influence of the eccentricity (deviation) of the electric wire, and it is possible to suppress a decrease in seal performance.

The shielded connector (1A) may further include a third shielding shell (for example, front shielding shell 97) configured to cover the front surface of the housing (20) other than the connector fitting portion (92).

With this configuration, when the shielded connector is not assembled such that the front surface side of the housing faces a metal casing of a connection counterpart, shielding properties of the shielded connector can be secured by covering the front surface side of the housing with the third shielding shell. In other words, in a case of the shielded connector assembled such that the front surface side of the housing faces the metal casing of the connection counterpart, the shielding properties can be secured without covering the front surface side of the housing with the third shielding shell.

What is claimed is:

1. A shielded connector comprising:

a housing having a front opening portion configured to be covered by an inner housing in which a connector fitting portion configured to be fitted to a mating connector is formed, and an electric wire insertion portion having a tubular shape and opened in a second direction intersecting a first direction in which the front opening opens;

a terminal configured to be accommodated in a terminal accommodating portion of the housing and having a distal portion configured to be connected to a mating terminal;

a connection terminal having one end configured to be connected to an end of an electric wire;

a first shielding shell configured to cover a rear surface of the housing opposite to a front surface of the housing on which the front opening portion is provided;

a second shielding shell having a braid connection portion to which a braid covering the electric wire led out from the electric wire insertion portion is to be connected, and a shell fixing portion configured to be electrically connected to the first shielding shell;

a first fastening member configured to fasten the housing to the first shielding shell;

a second fastening member configured to fasten the other end of the connection terminal to a placement portion of the terminal accommodated in the terminal accommodating portion of the housing; and a third fastening member configured to fasten the shell fixing portion of the second shielding shell to the first shielding shell, wherein the first fastening member, the second fastening member, and the third fastening member have fastening directions parallel to each other, and are fastened from a front surface side of the housing.

2. The shielded connector according to claim 1, wherein a positioning mechanism configured to position the housing with respect to the first shielding shell is provided between the first shielding shell and the rear surface of the housing.

3. The shielded connector according to claim 1, wherein the terminal accommodated in the terminal accommodating portion of the housing is positioned with respect to the second direction and is displaceable with respect to a direction orthogonal to the second direction.

4. The shielded connector according to claim 3, further comprising:

a waterproof member configured to be attached to the electric wire and to seal a gap between the electric wire insertion portion and the electric wire in a watertight manner, wherein the waterproof member includes:

a rubber portion having: an inner seal portion configured to contact in a pressed manner an outer peripheral surface of the electric wire; and an outer seal portion configured to contact in a pressed manner a first inner peripheral surface of the electric wire insertion portion; and a resin portion integrally having: a plurality of abutting portions configured to abut against the outer peripheral surface of the electric wire; and an outer annular portion configured to abut against a second inner peripheral surface of a narrowed portion provided on the first inner peripheral surface on a side of the electric wire insertion portion connected to the terminal accommodating portion, the resin portion being insert-molded in the rubber portion.

5. The shielded connector according to claim 1, further including:

a third shielding shell configured to cover the front surface of the housing other than the connector fitting portion.

* * * * *